United States Patent
Tran et al.

(10) Patent No.: US 11,847,546 B2
(45) Date of Patent: Dec. 19, 2023

(54) AUTOMATIC DATA PREPROCESSING

(71) Applicant: INTERNATIONAL BUSINESS MACHINES CORPORATION, Armonk, NY (US)

(72) Inventors: Ngoc Minh Tran, Dublin (IE); Mathieu Sinn, Dublin (IE); Thanh Lam Hoang, Maynooth (IE); Martin Wistuba, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1333 days.

(21) Appl. No.: 15/982,245

(22) Filed: May 17, 2018

(65) Prior Publication Data

US 2019/0354849 A1  Nov. 21, 2019

(51) Int. Cl.

| | |
|---|---|
| *G06N 3/006* | (2023.01) |
| *G06N 3/08* | (2023.01) |
| *G06N 20/00* | (2019.01) |
| *G06F 18/40* | (2023.01) |
| *G06F 18/2135* | (2023.01) |
| *G06V 10/764* | (2022.01) |
| *G06V 10/82* | (2022.01) |

(52) U.S. Cl.
CPC ......... *G06N 3/006* (2013.01); *G06F 18/2135* (2023.01); *G06F 18/41* (2023.01); *G06N 3/08* (2013.01); *G06N 20/00* (2019.01); *G06V 10/764* (2022.01); *G06V 10/82* (2022.01)

(58) Field of Classification Search
None
See application file for complete search history.

(56) References Cited

U.S. PATENT DOCUMENTS

| | | |
|---|---|---|
| 2014/0177947 A1 | 6/2014 | Krizhevsky et al. |
| 2018/0046939 A1 | 2/2018 | Meron et al. |
| 2019/0065884 A1* | 2/2019 | Li .................... G06K 9/627 |

FOREIGN PATENT DOCUMENTS

CN           107516135 A       12/2017

OTHER PUBLICATIONS

S. Yun, J. Choi, Y. Yoo, K. Yun and J. Choi, "Action-Decision Networks for Visual Tracking with Deep Reinforcement Learning," in 2017 IEEE Conference on Computer Vision and Pattern Recognition (CVPR), Honolulu, HI, USA, 2017 pp. 1349-1358. doi: 10.1109/CVPR.2017.148 (Year: 2017).*

Wirth, C., Fürnkranz, J., & Neumann, G. (2016, March). Model-free preference-based reinforcement learning. In Thirtieth AAAI Conference on Artificial Intelligence. (Year: 2016).*

(Continued)

*Primary Examiner* — Clifford Hilaire
(74) *Attorney, Agent, or Firm* — Griffiths & Seaton PLLC

(57) ABSTRACT

Embodiments for automatic data preprocessing for a machine learning operation by a processor. For each data instance in a set of data instances, a sequence of actions may be automatically learned in a reinforcement learning environment to be applied for preprocessing each data instance separately. Each of the data instances may be preprocessed for use by one or more machine learning models according to the learned sequence of actions.

14 Claims, 11 Drawing Sheets

(56) References Cited

OTHER PUBLICATIONS

Pal KK, Sudeep KS. Preprocessing for image classification by convolutional neural networks. In2016 IEEE International Conference on Recent Trends in Electronics, Information & Communication Technology (RTEICT) May 20, 2016 (pp. 1778-1781). IEEE. (Year: 2016).*

Perez L, Wang J. The effectiveness of data augmentation in image classification using deep learning. arXiv preprint arXiv: 1712.04621. Dec. 13, 2017. (Year: 2017).*

Rehman A, Saba T. Neural networks for document image preprocessing: state of the art. Artificial Intelligence Review. Aug. 2014;42(2):253-73. (Year: 2014).*

Mnih, V., Kavukcuoglu, K., Silver, D., Rusu, A.A., Veness, J., Bellemare, M.G., Graves, A., Riedmiller, M., Fidjeland, A.K., Ostrovski, G. and Petersen, S., 2015. Human-level control through deep reinforcement learning. nature, 518(7540), pp. 529-533. (Year: 2015).*

Antoniou A, Storkey A, Edwards H. Data augmentation generative adversarial networks. arXiv preprint arXiv:1711.04340. Nov. 12, 2017. (Year: 2017).*

Yun, Sangdoo, Jongwon Choi, Youngjoon Yoo, Kimin Yun, and Jin Young Choi. "Action-decision networks for visual tracking with deep reinforcement learning." In Proceedings of the IEEE conference on computer vision and pattern recognition, pp. 2711-2720. 2017. (Year: 2017).*

Feng et al., "Joint Extraction of Entities and Relations Using Reinforcement Learning and Deep Learning," Hindawi Computational Intelligence and Neuroscience, 2017 (12 pages).

Gemp et al., "Automated Data Cleansing through Meta-learning," Association for the Advancement of Artificial Intelligence, 2017 (2 pages).

Hoang et al., "Learning Features For Relational Data," ACM Conference '17, Jul. 2017 (12 pages).

Caicedo et al., "Active Object Localization with Deep Reinforcement Learning," ICCV, 2015 (9 pages).

Wang et al., "The Effectiveness of Data Augmentation in Image Classification using Deep Learning," arXiv:1712.04621v1 [cs.CV], Dec. 13, 2017 (8 pages).

Bhanu et al., "Adaptive Integrated Image Segmentation and Object Recognition," IEEE Transactions on Systems, Man, and Cybernetics—Part C: Applications and Reviews, vol. 30, No. 4, Nov. 2000 (15 pages).

Paulin et al., "Transformation Pursuit for Image Classification," CVPR, 2014 (9 pages).

Bilalli et al., "Automated Data Pre-processing via Meta-learning," MEDI, 2016 (14 pages).

Gherega et al., "A Q-Learning Approach to Decision Problems in Image Processing," MMEDIA 2012: The Fourth International Conferences on Advances in Multimedia, 2012 (7 pages).

Pal et al., "Preprocessing for Image Classification by Convolutional Neural Networks," IEEE International Conference on Recent Trends in Electronics Information Communication Technology, May 20-21, 2016 (4 pages).

* cited by examiner

US 11,847,546 B2

AUTOMATIC DATA PREPROCESSING

BACKGROUND OF THE INVENTION

Field of the Invention

The present invention relates in general to computing systems, and more particularly, to various embodiments for automatic data preprocessing for a machine learning operation by a processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. A task of a data scientist is to enable a machine learning model to eliminate any bottlenecks in a machine learning process.

SUMMARY OF THE INVENTION

Various embodiments for automatic data preprocessing using one or more processors are provided. In one embodiment, by way of example only, a method for automatic data preprocessing for a machine learning operation, again by a processor, is provided. For each data instance in a set of data instances, a sequence of actions may be automatically learned in a reinforcement learning environment to be applied for preprocessing each data instance separately. Each of the data instances may be preprocessed for use by one or more machine learning models according to the learned sequence of actions.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
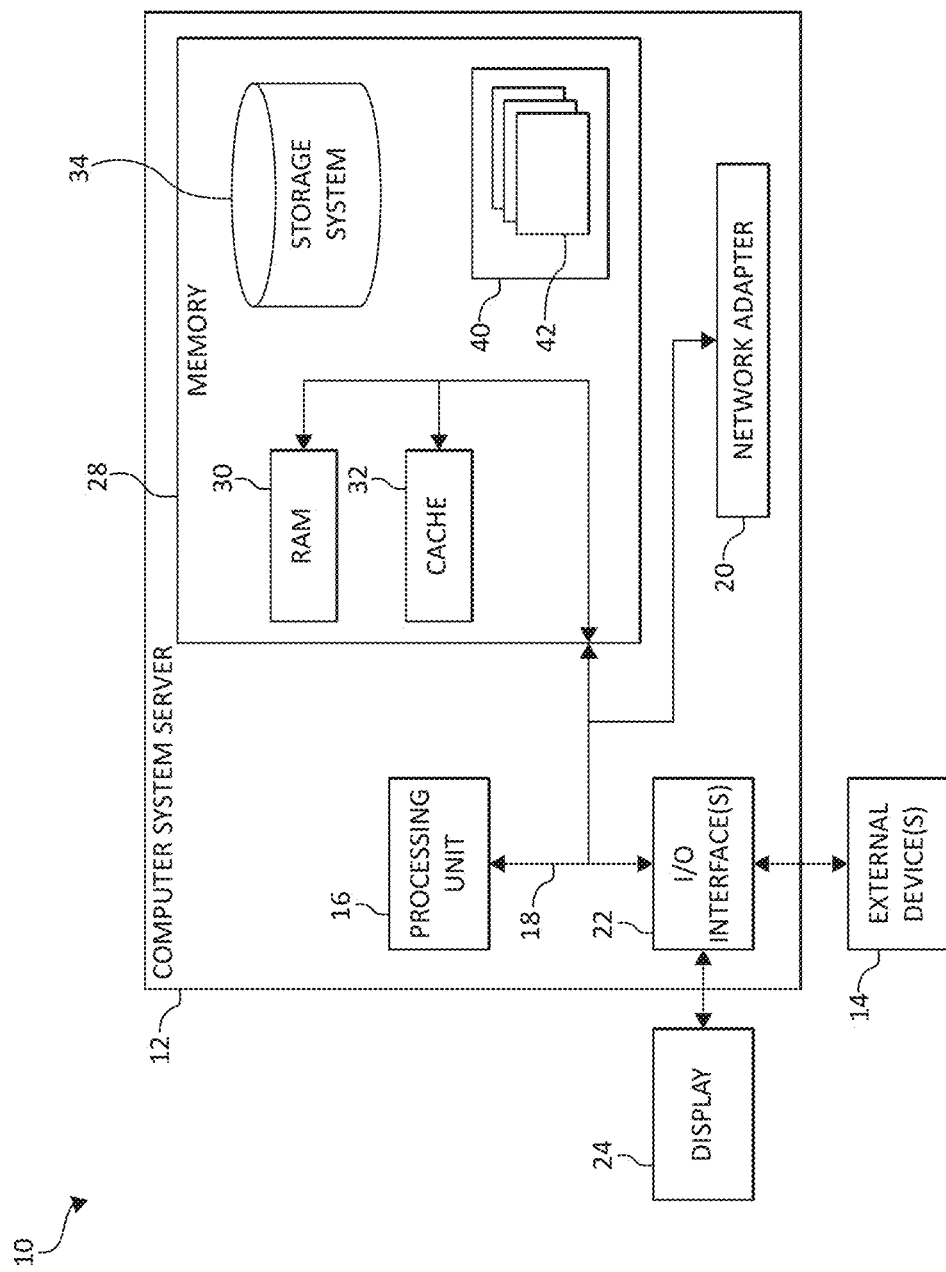
FIG. 1 is a block diagram depicting an exemplary computing node according to an embodiment of the present invention.

Data preprocessing, which involves transforming raw data into an understandable format, may account for about a majority of analysis time. Tasks in data preprocessing include data cleaning, data integration, data transformation, data reduction, and data discretization. With a large amount of work, data preprocessing becomes a bottleneck in a machine learning project. Furthermore, output of a preprocessing stage will be served as input for machine learning models. Therefore, if the preprocessing output does not efficiently remove noise exposed rich information, efficiently learning and obtaining accurate machine learning models becomes extremely difficult and challenging.

Unstructured data such as, for example, images, texts, and/or time series data may contain not only rich information but also a significant amount of noise. Similarly, structured data may contain abnormal cases. Preprocessing unstructured and structured data based on manual efforts of data scientists are inefficient to produce clean and easy-to-learn data for machine learning modeling. Moreover, such manual efforts are computationally expensive, time consuming, and inefficient in terms of modeling performance. Hence, a need exists for automated data preprocessing to eliminate any noise in the data, increase computing efficiency, reduce costs of delivering analytics projects, and to increase productivity of data scientists.

Accordingly, the present invention provides for automatic data preprocessing for a machine learning operation. For each data instance in a set of data instances, a sequence of actions may be automatically learned in a reinforcement learning environment to be applied for preprocessing each data instance separately. Each of the data instances may be preprocessed for use by one or more machine learning models according to the learned sequence of actions.

In one aspect, the present invention provides for automation of data preprocessing ("AutoDP"). That is, automatic data preprocessing preprocessed each data instance differently. The automatic data preprocessing may also preprocess unstructured and structured data using one or more preprocessing techniques in a reinforced learning framework/environment.

Thus, the present invention provides for automating the data preprocessing stage to improve the performance of machine learning projects in terms of cost effectiveness and technical quality of the outcomes, such as accuracy of predictive models. The present invention also provides explainable data preprocessing to enable a user, administrator, or other entity to inspect which transformations were applied to each data instance during the preprocessing.

As used herein, a data instance in a data set may refer to the term "example" or "observation" in machine learning. A data instance may be structured data, unstructured data or a combination of structured data and unstructured data. The term "unstructured data" may include, for example, images, texts, or time series data. The term "structured data" may refer to data represented by column features such as, for example, in relational databases. The more data there is for a data instance, the more information may be inferred assuming the data is preprocessed efficiently. Preprocessing a data instance may refer to a transformation of the instance into another form. Examples of preprocessing steps may include, but are not limited to: 1) rotating, cropping, flipping for images; 2) term frequency ("TF"), term frequency-inverse document frequency ("TF-IDF"), Word2Vec for text data, and/or 3) Fourier Transform, Wavelet Transform, Periodicity Transform for time series data. An instance may be preprocessed through several steps before it is input into machine learning models. It should be noted that the terms preprocess and transform may be used interchangeably to indicate an operation applied to data instances such as, for example, flipping an image.

It should be noted that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
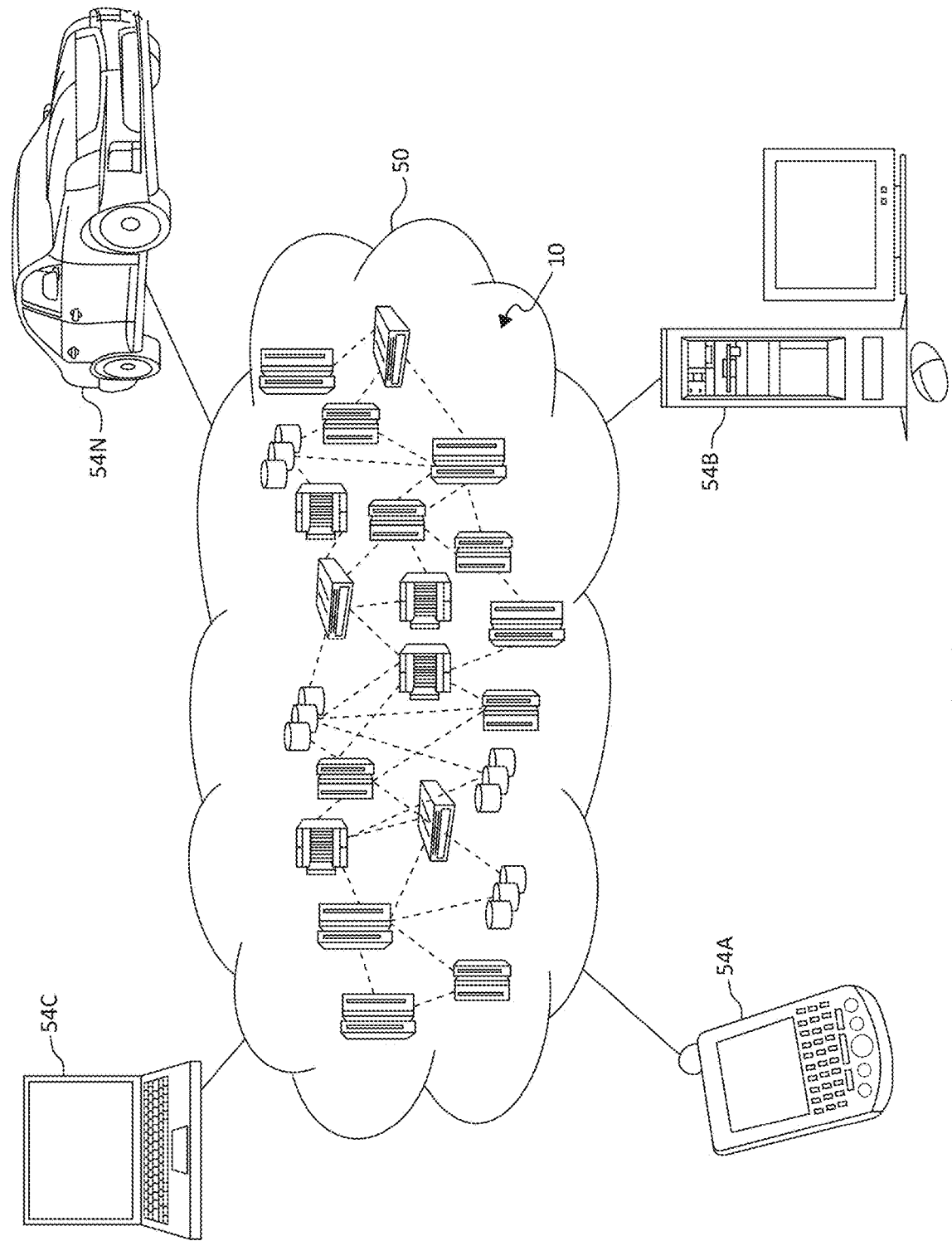
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
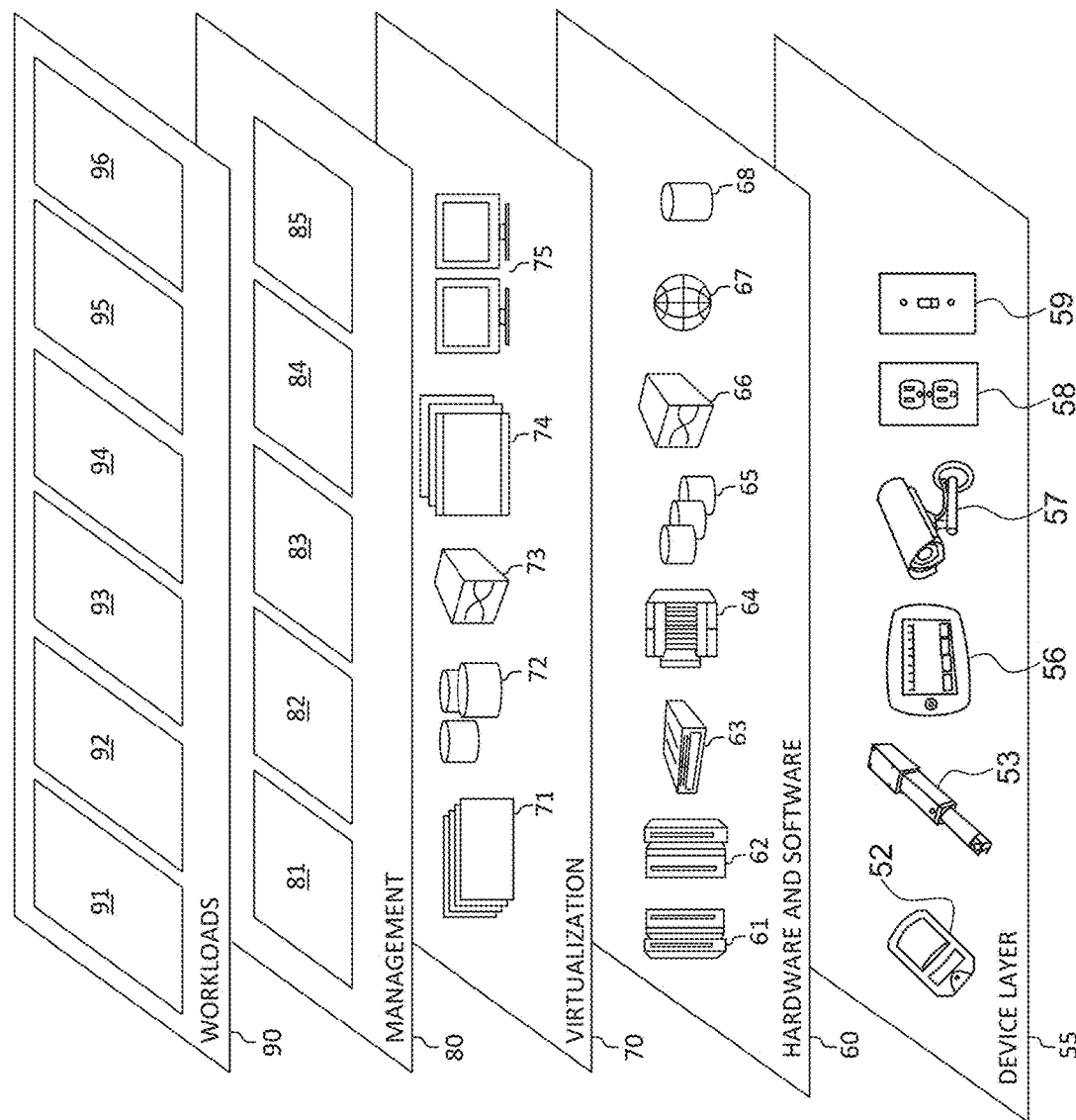
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various automatic data preprocessing workloads and functions 96. In addition, automatic data preprocessing workloads and functions 96 may include such operations as data analytics, data analysis, and as will be further described, notification functionality. One of ordinary skill in the art will appreciate that the automatic data preprocessing workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As a preliminary matter, as used herein, "state" in a reinforcement learning framework may be defined as a data instance (e.g., image) and thus an original state corresponds to an original data instance from a data set and a transformed state corresponds to a preprocessed data instance. As such, a state space may consist of all original source data instances as well as all data instances transformed by an arbitrary chain of transformations (approximately $\Sigma_{i=1}^{n} A_n^l$ states, where $A_n^l$ is a 1-permutation of n). If the size of a transformation set n reaches infinity, the state space also becomes infinite. Actions may be defined as preprocessing techniques/operations that may be used to preprocess the data set in the reinforcement learning framework 420 such as, for example, preprocessing techniques/operations for image processing, text processing and time series processing.

Turning now to FIGS. 4A-4D, block diagrams depicting exemplary functional components 400 according to various mechanisms of the illustrated embodiments is shown. FIGS. 4A-4D illustrate automatic data preprocessing workloads and functions using a reinforcement learning framework in a computing environment, such as a computing environment 400, according to an example of the present technology. As will be seen, many of the functional blocks may also be considered "modules" or "components" of functionality, in the same descriptive sense as has been previously described in FIGS. 1-3. With the foregoing in mind, the module/component blocks 400 may also be incorporated into various hardware and software components of a system for automatic data preprocessing in accordance with the present invention. Many of the functional blocks 400 may execute as background processes on various components, either in distributed computing components, or on the user device, or elsewhere.

The computing environment 400 may include a reinforcement learning framework 420. In one example, the reinforcement learning framework 420 may receive one or more inputs from a data source 410 (e.g., one or more data instances). The reinforcement learning framework 420 may include an agent 422 and an environment 428. The agent 422 may include a decision maker 424 and one or more artificial neural networks 426 (e.g., deep neural networks).

The decision maker 424 may deploy a reinforcement learning policy. The decision maker 424 may be responsible for selecting a next action to apply to a current state. The action and the state may then be transferred to the environment component 428 for further processing. For example, the decision maker 424 may use a max policy to select an appropriate action, given a deep Q-network ("DQN") output layer. Furthermore, in order to enable the exploration of reinforcement learning, the decision maker 424 may select a next action randomly with some probability, which is known as an $\epsilon$-greedy exploration strategy. The probability $\epsilon$ may start at a maximum of 1.0 and is annealed down to a minimum of 0.1 during training.

The environment 428 (e.g., environment component) may be where actual transformations/preprocessing of each data instance is performed. In addition, the environment 428 may be responsible for calculating return rewards during training. Upon receiving a data instance (e.g., an image) and an action from the reinforcement learning agent 422, the environment 428 may behave differently depending on the type of the action.

In one aspect, the data source 410 may be structured data, unstructured data, and/or a combination of structured data and unstructured data. The data source 410 may be provided by a user. That is, the data source 410, which may be provided by a user, may include a defined learning task, a set of data instances, a set of actions, and a set of constraints indicating which actions may be applied to a selected part of a data instance. For example, a rotation operation may be applied for images and wavelet transform can be applied for time series data. The defined learning task can either be supervised or unsupervised learning. An objective learning function may also be provided under the defined learning task. The data set may include unstructured data: spatio-temporal data, time-series, sequences, item sets, number sets, singleton, texts and images, and data such as, for example, numerical and categorical. The data set may also include structured data: relational databases and non-relational (e.g., a NoSQL database) databases. The data set may also include labels in case the defined task is of supervised learning. The set of actions may include preprocessing techniques that may be used to preprocess the data set. The set of actions may include, but is not limited to, techniques for image processing, text processing, and time series processing. The reinforcement learning framework 420 may process the inputs such that an output is provided of completely preprocessed data instance (e.g., preprocessed images). The reinforcement learning framework 420 may automatically learn for each instance in the data set a sequence of actions to be applied for the instance as well as how the subset is applied. The reinforcement learning framework 420 may output 430 a detailed method of how to preprocess each data instance separately as well as the preprocessed data instances (e.g., completely transformed images).

More specifically, the reinforcement learning framework 420 may include two essential components, which are the agent 422 and environment 428. Given an input (e.g., a data instance or data source 410) the agent 422 may have a policy represented by the artificial neural network 426, whose output is action values used by the decision maker 424 to decide if the data instance is preprocessed enough or it needs additional transformations (e.g., additional preprocessing). The environment 428 may be responsible for transforming the data instance upon request by the agent 422, where a selected transformation operation may also be provided together with a request. Then, the environment 428 continues to feed the transformed/preprocessed data instance (e.g., preprocessed image) into the artificial neural network 426 for a new evaluation. This process may be iterated until the agent 422 determines and/or makes a final decision to stop preprocessing the transformed/preprocessed data instance (e.g., preprocessed image). In addition to doing the actual data instance transformations, the environment 428 may also evaluate an impact of each transformation and produce rewards based on that.

Figure 4A:
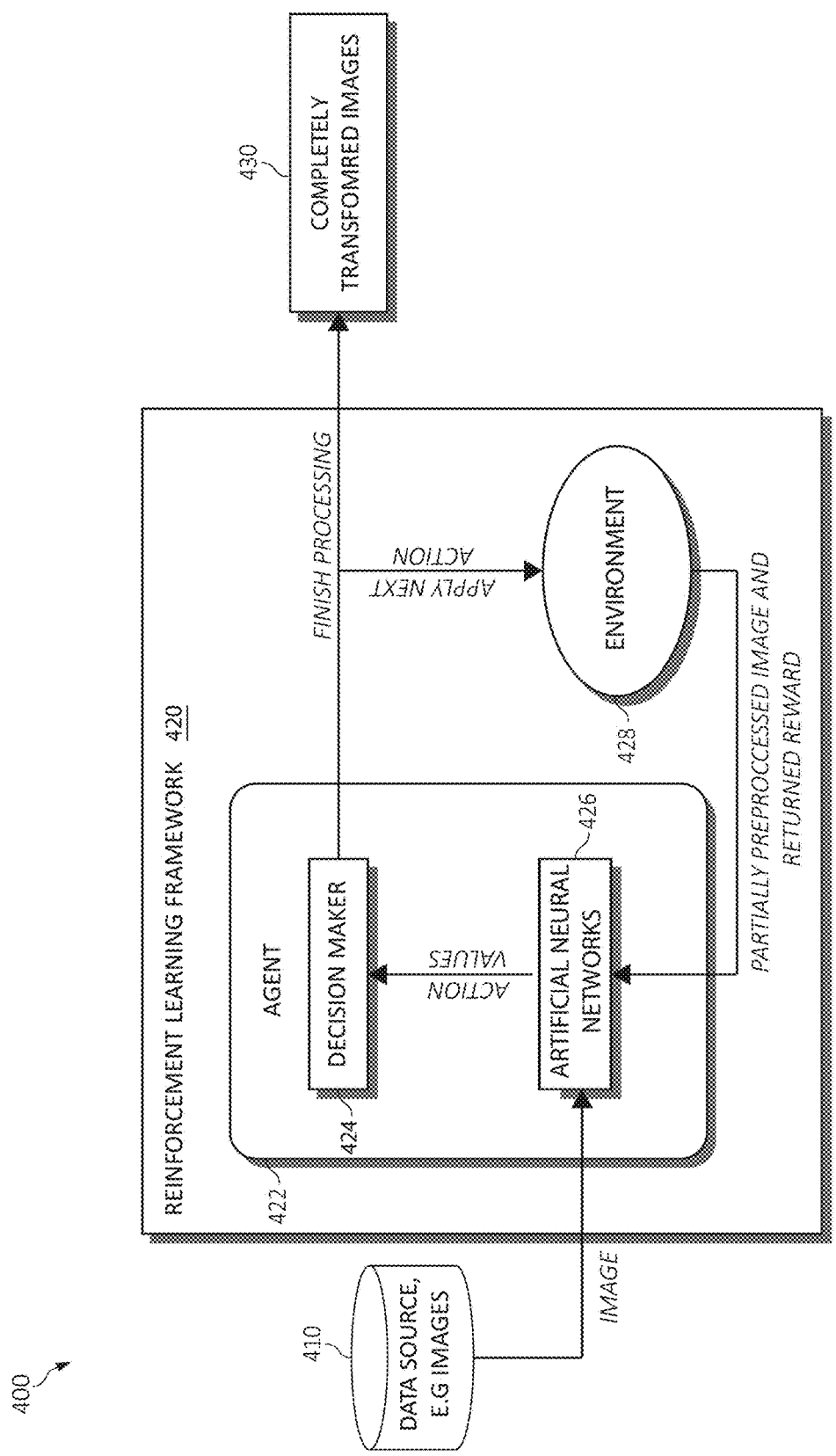
FIG. 4A-4D are diagrams depicting computing components for automatic data preprocessing in accordance with aspects of the present invention.
Figure 4B:
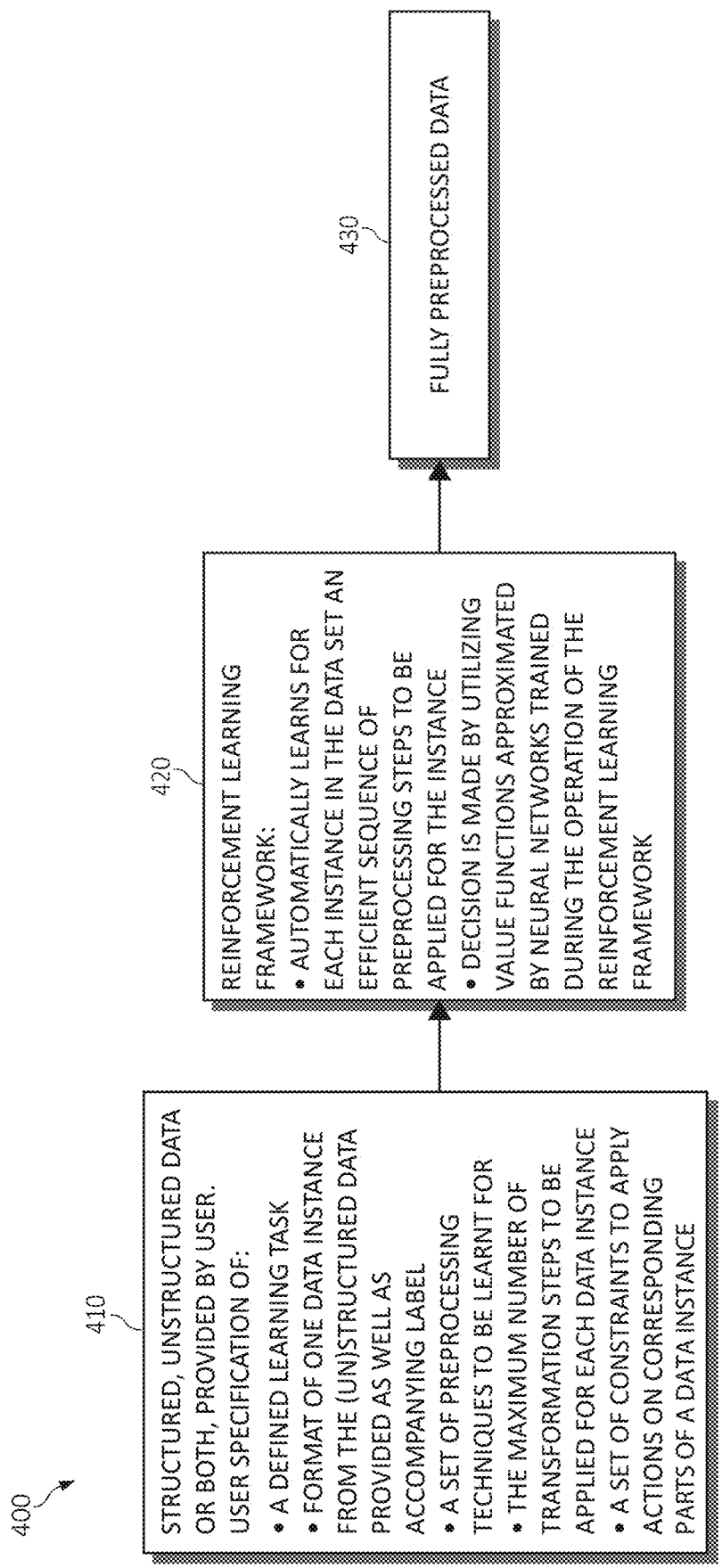

Turning now to FIG. 4B, the data source 410 (e.g., structured data, unstructured data, and/or a combination of structured data and unstructured data) may be input into the reinforcement learning framework 420. It should be noted that the input of the data source 410 may be the same input or different input depending on the data instance and/or context as compared to FIGS. 4B-D. The reinforcement learning framework 420 may automatically learn for each instance in the data set a sequence of preprocessing steps/operations to be applied to a data instance. A decision may be made by the reinforcement learning framework 420 utilizing value functions approximated by the artificial neural networks 426 trained during the operation of the reinforcement learning framework 420. The output 430 may be complete (e.g., "completely") preprocessed data (e.g. fully or completely transformed images).

Figure 4C:
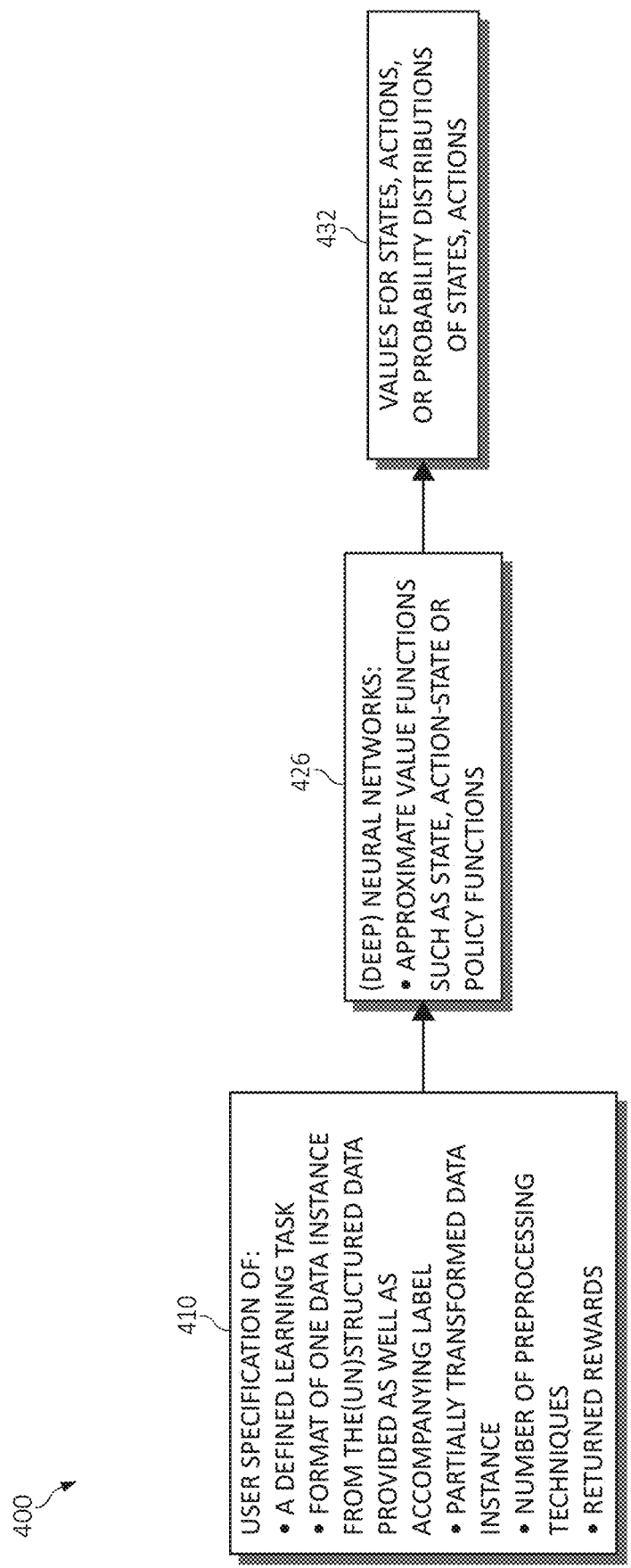

As illustrated in FIG. 4C, the data source 410 (e.g., structured data, unstructured data, and/or a combination of structured data and unstructured data) may be used by the artificial neural networks 426 to approximate one or more value functions such as, for example, a state, an action-state, and/or policy functions. It should be noted that the input of the data source 410 may be the same input or different input depending on the data instance and/or context as compared to FIGS. 4A and 4D. The artificial neural networks 426 may provide as output 432 values for the states, actions, or probability distributions of states and/or actions.

Figure 4D:
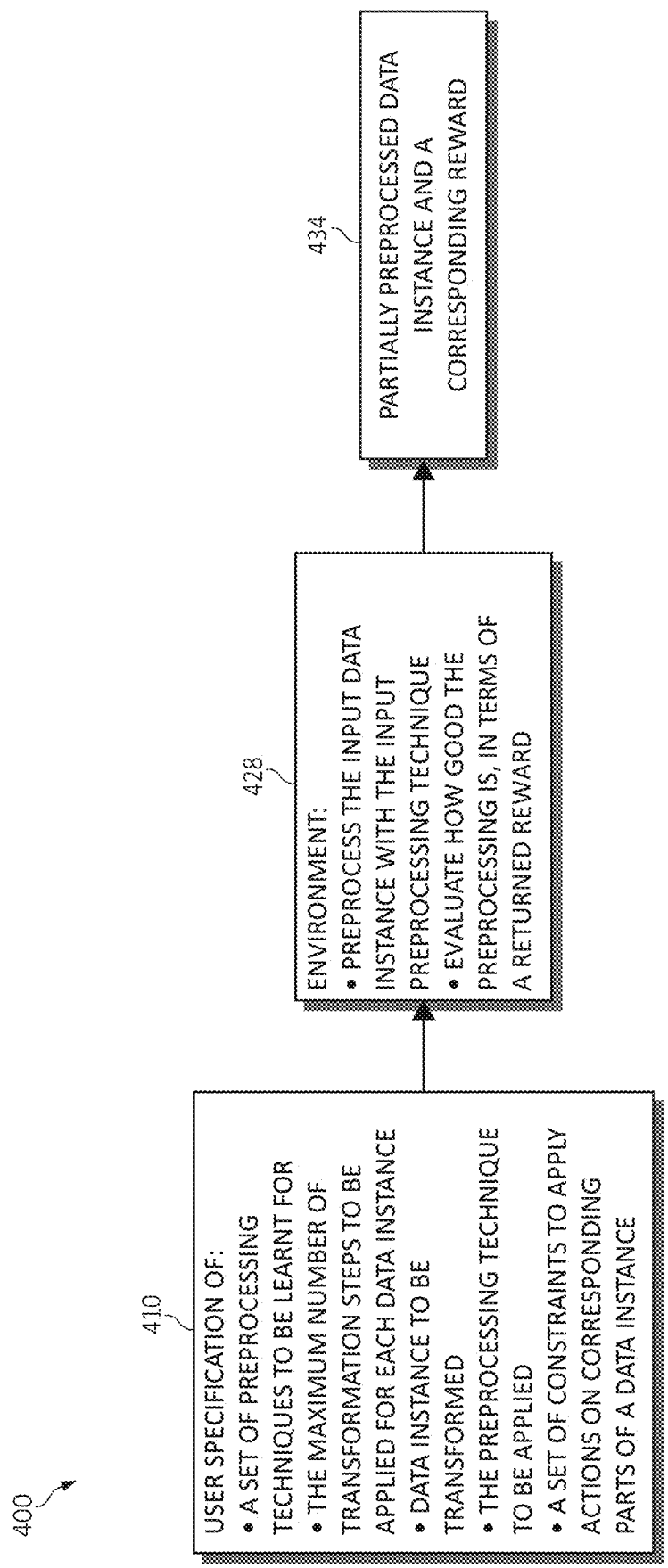

In FIG. 4D, the data source 410 (e.g., structured data, unstructured data, and/or a combination of structured data and unstructured data) may be used by the environment 428 (e.g., environment component 428) to preprocess the input data instance (e.g., data source 410) with one or more input processing operations (e.g., techniques). It should be noted that the input of the data source 410 may be the same input or different input depending on the data instance and/or context as compared to FIGS. 4A and 4D. The environment component 428 may evaluate a level of preprocessing quality using a returned reward. The output 434 may be a partially preprocessed data instance and a corresponding reward.

Figure 5:
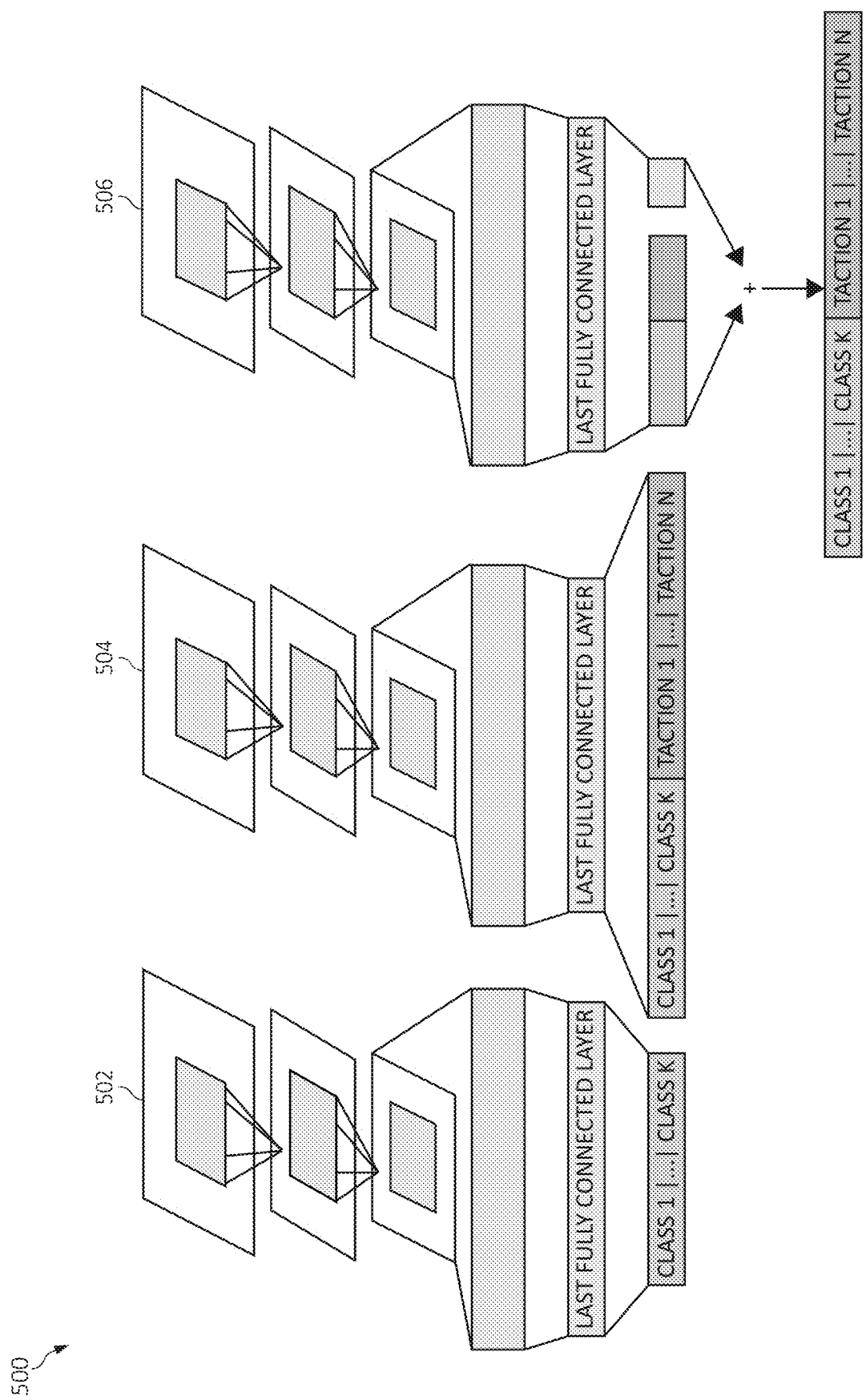
FIG. 5 is an additional block diagram depicting exemplary artificial neural network policies in accordance with aspects of the present invention.

Turning now to FIG. 5, a block diagram depicts exemplary deep neural network policies 500 for use in the artificial neural network 426 of FIG. 4. More specifically, a format of a convolutional neural network (CNN) 502 is depicted whose output is a logit vector with k values representing the corresponding possibility of k classes. In one aspect, by way of example only, a variant of Deep Q-Network (DQN) 504 may be used to model a network policy. The deep neural network policy implemented in a DQN 504 resembles the CNN 502 except that the output layer is extended to form an action space. The DQN 504 output layer containing Q-values consists of two parts that are corresponding to two groups of actions. The first part may be a vector playing the same role (e.g., same three roles) as a logit vector in the CNN 502 (e.g., representing the possibility of k classes such as, for example class 1, . . . , class k). Each slot may be denoted as a stop action ("StopAction$_i$"). (Stop action may mean that there is no further processing for one data instance.). If the decision maker 424 decides a next action as one of the stop actions (e.g., StopAction$_i$), the preprocessing of an input data instance (e.g., data source 502) may stop with a prediction of class$_1$ for the input data instance. The second part of the DQN 504 output layer is a vector representing a set of n transformation actions (e.g., T Action$_{1, \ldots, n}$). If a decision is made for a next action with one of the transformation actions T Action$_j$, the current data instance will be continued to preprocess with the transformation j. The two sets of stop and transformation actions form an action space which has totally k+n actions in a discrete case. However, for generalization, it may be completely feasible to define continuous actions. For example, a continuous rotation operation may be modeled by defining two slots in a second part of the DQN 504 output: 1) one slot for the Q-value of the rotation action and 2) one slot for the value of the rotation angle. Likewise, the first part of the DQN 504 output may be adapted to a regression task to apply the reinforcement learning framework 420 to a regression problem with other input types such as, for example, time series. By using the DQN 504, more performance is gained with other variants of DQN.

In an additional aspect, a variant of DQN, namely Dueling DQN (DDQN) 506 may be used. In the DDQN 506, the Q-values may be a combination of a value function and an advantage function, which may be separated. The value function may specify the quality level for being in a given state, which may be above a defined threshold or percentage, (e.g., the value function may specify "how good it is to be in a given state"). The advantage function indicates may indicate (via a value above a defined threshold or percentage) how much better selecting an action is as compared to current actions. The benefit of separating the two functions is that the reinforcement learning framework 420 does not need to learn both value and advantage at the same time and, therefore, the DDQN 506 is able to efficiently learn the state-value function. In order to update the artificial neural network 426, a Bellman equation may be used (e.g., $Q(s, a)=r+\gamma*\max_a'(Q(s', a'))$, where Q(s, a) is the DQN 504 output value of action a given input state s, r, and s' are the reward and the next state returned by the environment 428 when the action a is applied to the state s, and γ is the maximum discounted parameter).

It should be noted that the reinforcement learning framework 420 may include a feature/property that any selected transformation operation may include a symmetry feature. That is, due to a trial-and-error nature of the reinforcement learning framework 420, it is essential to allow the data instance to be recovered after a trial transformation that may result in an error. For example, if there is a rotation transformation with an angle α, there should be another rotation transformation with an angle-α. For transformation operations such as, for example, cropping, there is no available symmetry property. Accordingly, the reinforcement learning framework 420 may include a memory (see FIG. 1) to remember states before any transformation operation occurs. However, given a potential requirement of requiring a significant amount of memory usage for long transformation chains, the reinforcement learning framework 420 may also control a maximum length of a transformation chain using environment 428.

For example, if the action is a transformation action, the environment 428 of FIG. 4A may apply a transformation to the data instance only if the length of a chain of transformations applied particularly to that data instance is smaller than a configurable parameter ("max_len"), which may, for example, be equal to 10 by default. If the chain of transformations is longer than max_len, the data instance may be recovered to an original state of the data instance and the reinforcement learning framework 420 must seek another transformation chain for the data instance. It should be noted that the reinforcement learning framework 420 may provide a recovery operation that may be used for training. At testing, the environment 428 may select a stop action with the largest Q-value for the prediction of the image. The recovery operation of the reinforcement learning framework 420 also solves the memory usage challenge. Regardless of what the length of the current transformation chain is, the environment 428 may return a zero reward to the reinforcement learning agent 422 in this case, for example. If the environment 428 receives a stop action $StopAction_i$, the environment 428 does not return any new data instance but may return a reward and may classify the original image as $class_i$. The returning of a reward during the training enhances the computing efficiency on the convergence of the training. The environment 428 may use a ground true label of the original image to provide a reward. In one aspect, a reward of +1 may be provided if a label is equal to i or the reward may be −1 if the label is not equal to i. However, such approach may cause an unbalance of rewards when the number of classes k is larger than a defined value (e.g., "2"). Hence, reinforcement learning framework 420 may compute a return rewards, which is to assign a reward of k−1 if the label is equal to i or assign a reward of −1 if the label is not equal to i.

Figure 6:
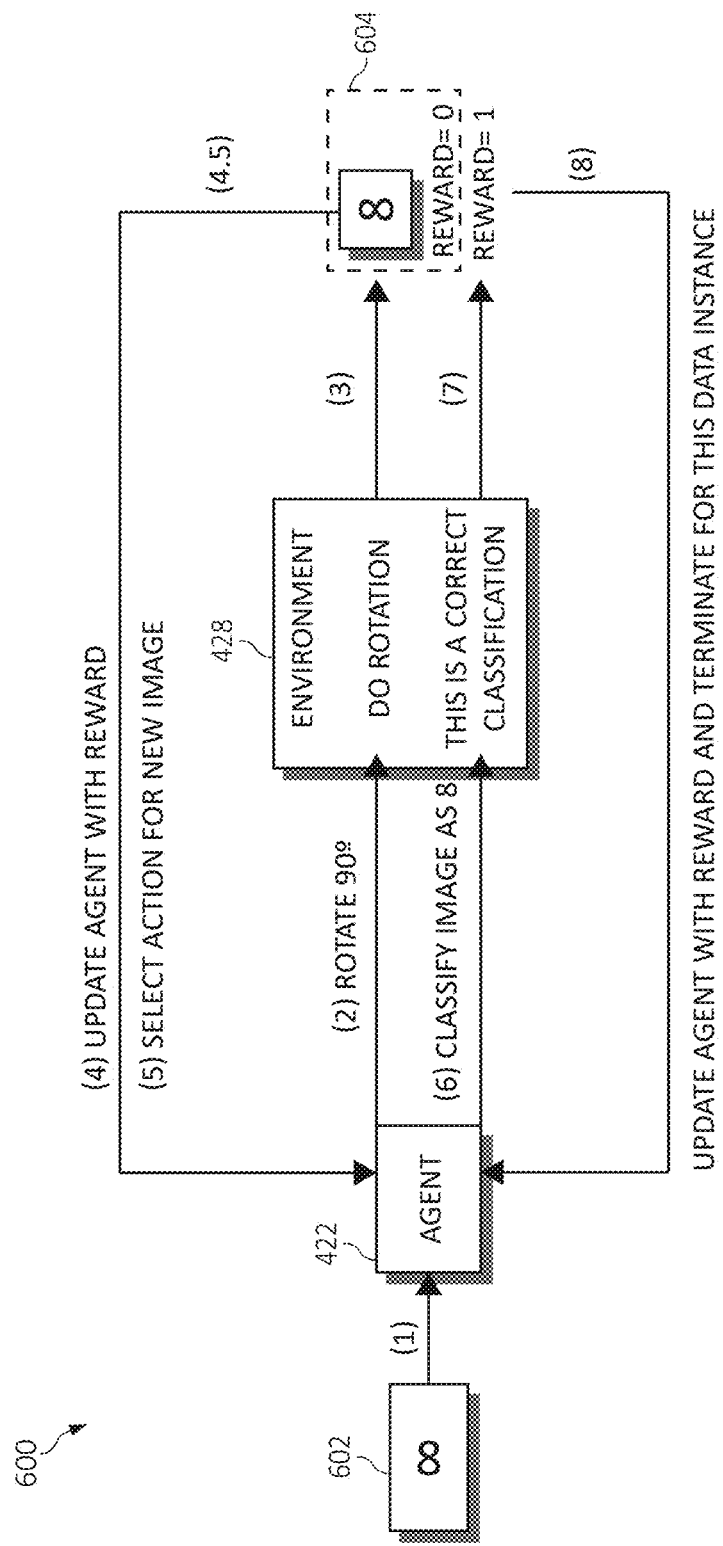
FIG. 6 is an additional block diagram depicting various implementations of automatic data preprocessing in accordance with aspects of the present invention.

Turning now to FIG. 6, a block-flow diagram depicts an exemplary use case for automatic data preprocessing using the various components of FIGS. 4A-4D and FIG. 5. As depicted, in step 1) a data instance 602 (e.g., an image) may be received by the agent 422 of FIG. 4. In step 2), the agent 422 may determine and/or provide instructions to perform a transformation operation on the data instance 602 (which may be structured data, unstructured data, and/or both structured and unstructured data) such as, for example, rotating the image 90 degrees. The environment 428 may perform the transformation operation on the data instance 602 such as, for example, rotating the image 90 degrees. In step 3), the environment 428 may assign a reward to the transformed data 604 instance such as, for example, a value of zero ("0"). In step 4) the agent 422 may be updated with the reward (that was assigned) and in step 5) the agent may select an action for the new transformed data instance 604 (e.g., the new image). In step 6) the agent may classify the transformed data instance 604 (e.g., the rotated image). The environment 428 may determine a correct classification and in step 7) the environment 428 may assign a reward to the classified, transformed data instance 604 such as, for example, a value of one ("1"). In step 8) the agent 422 may be updated with the reward (e.g., "1") and terminate data processing for the classified, transformed data instance 604 (e.g., the classified, rotated image.).

Figure 7:
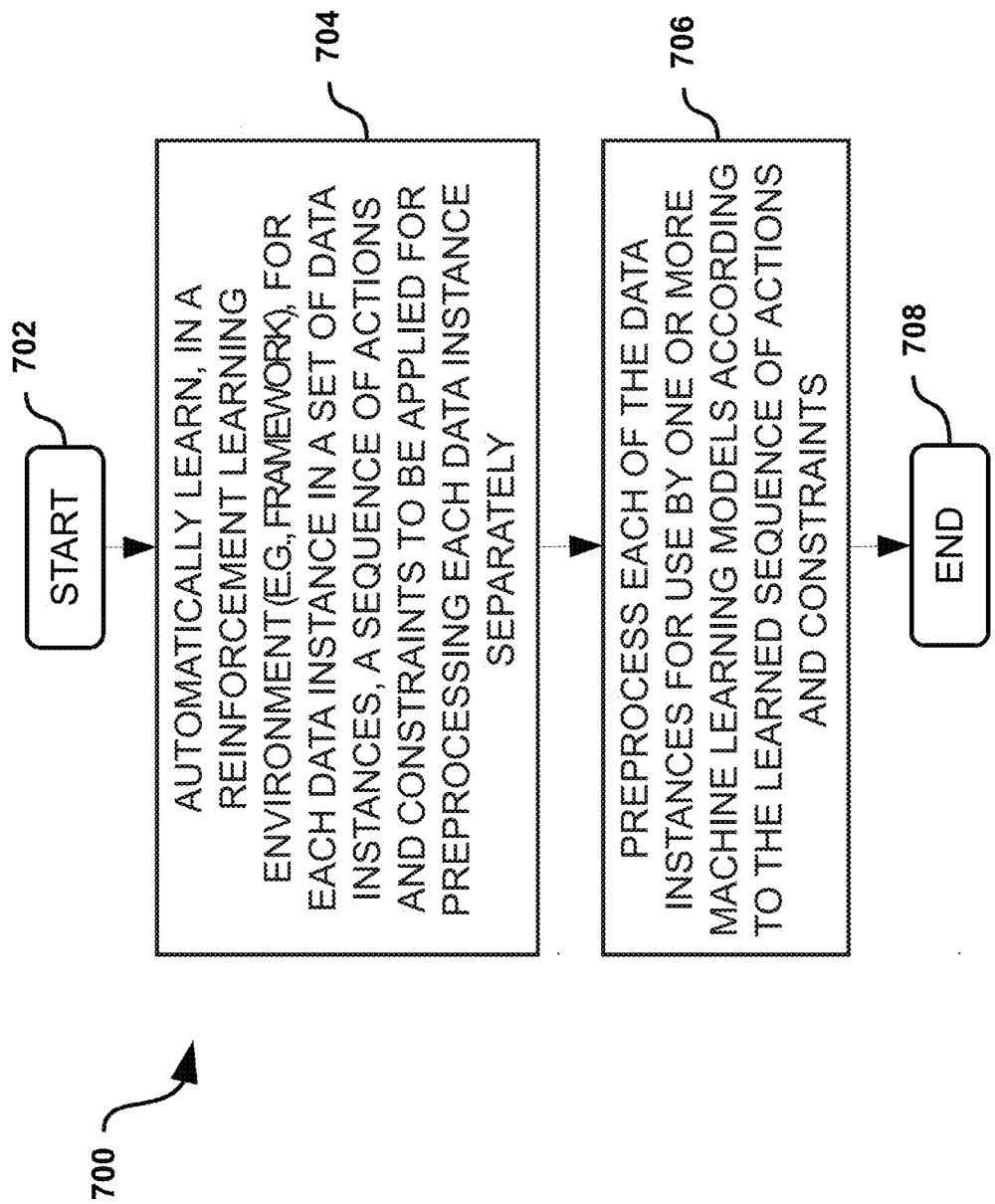
FIG. 7 is a flowchart diagram depicting an additional exemplary method for automatic data preprocessing for a machine learning operation by a processor in which aspects of the present invention may be realized.

Turning now to FIG. 7, a method 700 for automatic data preprocessing for a machine learning operation by a processor is depicted, in which various aspects of the illustrated embodiments may be implemented. The functionality 700 may be implemented as a method executed as instructions on a machine, where the instructions are included on at least one computer readable medium or one non-transitory machine-readable storage medium. The functionality 700 may start in block 702.

For each data instance in a set of data instances, a sequence of actions may be automatically learned in a reinforcement learning environment to be applied for preprocessing each data instance separately, as in block 704. Each of the data instances may be preprocessed for use by one or more machine learning models according to the learned sequence of actions as in block 706. The functionality 700 may end, as in block 708.

Figure 8:
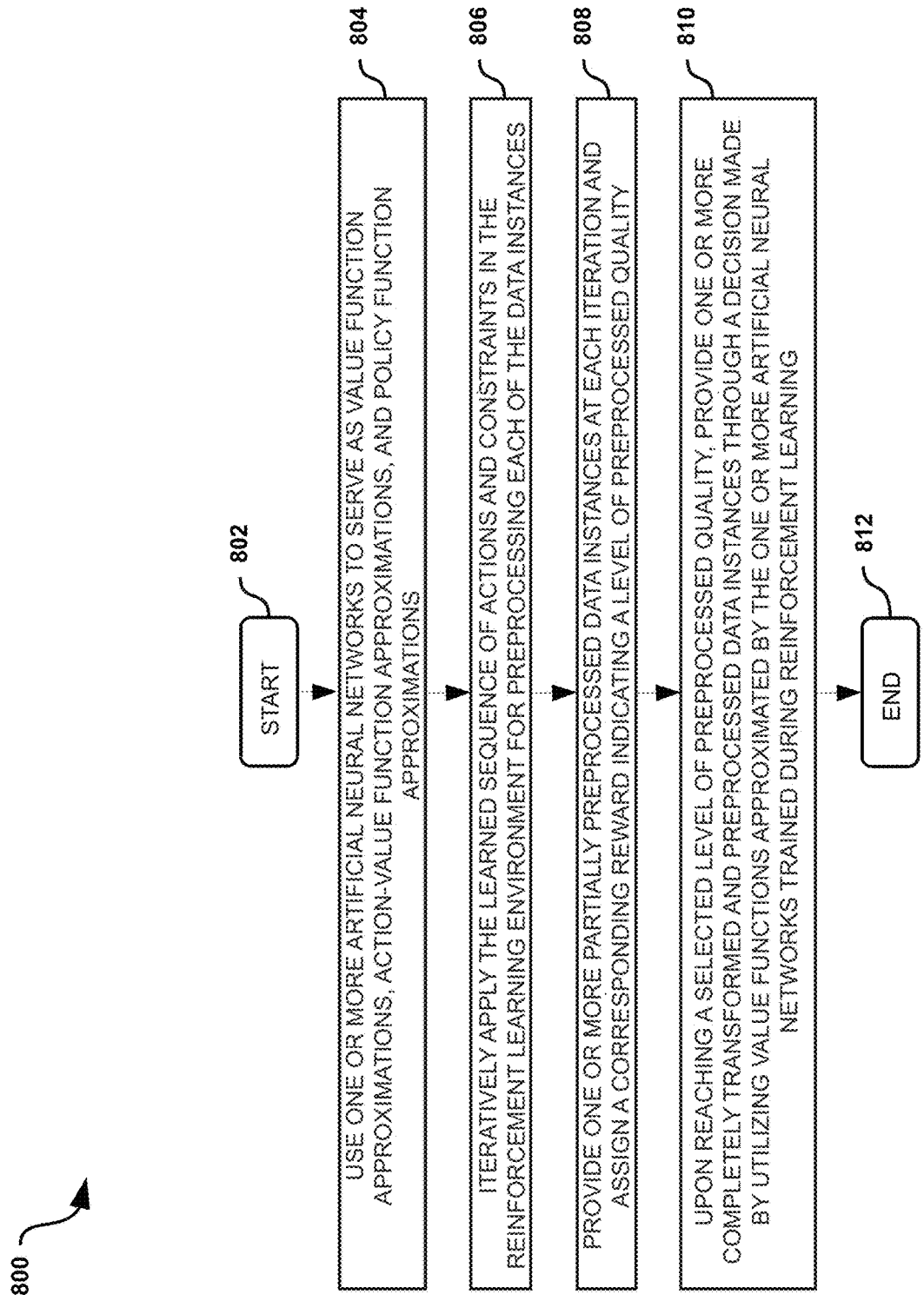
FIG. 8 is an additional flowchart diagram depicting an additional exemplary method for automatic learning for automatic data preprocessing for a machine learning operation by a processor, again in which aspects of the present invention may be realized.

Turning now to FIG. 8, a method 800 for automatic learning the automatic data preprocessing for a machine learning operation by a processor is depicted, in which various aspects of the illustrated embodiments may be implemented. That is, in association with block 704 of FIG. 7, method 800 may be executed. That is, method 800 may be one or more sub-steps of with block 704 of FIG. 7. The functionality 800 may be implemented as a method executed as instructions on a machine, where the instructions are included on at least one computer readable medium or one non-transitory machine-readable storage medium. The functionality 800 may start in block 802. One or more artificial neural networks may be used to serve as value function approximations, action-value function approximations, and policy function approximations in the reinforcement learning environment, as in block 804. A sequence of actions in the reinforcement learning may be iteratively learned for preprocessing each of the data instances, as in block 806. One or more partially preprocessed data instances may be provided at each iteration and assign a corresponding reward indicating a level of preprocessed quality, as in block 808. Upon reaching a selected level of preprocessed quality, one or more completely transformed and preprocessed data instances may be provided through a decision made by utilizing value functions approximated by the one or more artificial neural networks trained during reinforcement learning, as in block 810. The functionality 800 may end, as in block 812.

In one aspect, in conjunction with and/or as part of at least one block of FIGS. 7-8, the operations of methods 700 and 800 may include each of the following. The operations of methods 700 and 800 may also receive from a user a defined learning task, the set of data instances, and one or more actions for performing reinforcement learning and preprocessing each of the data instances.

In an additional aspect, the operations of methods 700 and 800 may also include using the reinforcement learning environment to determine the sequence of actions for preprocessing and transforming each of the data instances separately. Also, the one or more artificial neural networks that are used may serve as value function approximations, action-value function approximations, and policy function approximations for both approximating a corresponding function used in reinforcement learning and for updating one or more policies. The reinforcement learning environment may include an agent having one or more decision components and the one or more artificial neural networks. The operations of methods 700 and 800 may apply the learned sequence of actions and constraints in the reinforcement learning environment for preprocessing each of the data instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for automatic data preprocessing for a machine learning operation by a processor, comprising:
    receiving, from a data source, raw data comprising a set of data instances used as input to one or more machine learning models subsequent to the set of data instances being preprocessed, wherein the set of data instances are received with user specification of information including a defined learning task associated with the set of data instances, a set of actions to perform when preprocessing the set of data instances based on a content of the set of data instances, and a set of constraints indicating which of the set of actions are to be applied to a selected part of a data instance of the set of data instances;
    automatically learning in a reinforcement learning environment, for each data instance in the set of data instances, a sequence of preprocessing operations for preprocessing each of the data instances separately;
    preprocessing each of the data instances separately by iteratively applying the learned sequence of preprocessing operations, wherein the preprocessing is performed in the reinforcement learning environment utilizing a reward-based training operation by one or more artificial neural networks; and
    outputting a detailed method of the performance of the preprocessing with the preprocessed set of data instances.

2. The method of claim 1, wherein automatically learning further includes using reinforcement learning to determine the sequence of actions for preprocessing and transforming each of the data instances separately.

3. The method of claim 1, further including using the one or more artificial neural networks to serve as value function approximations, action-value function approximations, and policy function approximations for both approximating a corresponding function used in reinforcement learning and for updating one or more policies, wherein the reinforcement learning environment includes an agent having one or more decision components and the one or more artificial neural networks.

4. The method of claim 1, further including providing one or more completely transformed and preprocessed data instances through a decision made by utilizing value functions approximated by the one or more artificial neural networks trained during the reward-based training operation.

5. The method of claim 1, further including providing one or more partially preprocessed data instances and a corresponding reward indicating a level of preprocessed quality for the one or more partially transformed and preprocessed data instances.

6. A system for automatic data preprocessing for a machine learning operation, comprising:
    one or more computers with executable instructions that when executed cause the system to:
        receive, from a data source, raw data comprising a set of data instances used as input to one or more machine learning models subsequent to the set of data instances being preprocessed, wherein the set of data instances are received with user specification of information including a defined learning task associated with the set of data instances, a set of actions to perform when preprocessing the set of data instances based on a content of the set of data instances, and a set of constraints indicating which of the set of actions are to be applied to a selected part of a data instance of the set of data instances;
        automatically learn in a reinforcement learning environment, for each data instance in the set of data instances, a sequence of preprocessing operations for preprocessing each of the data instances separately;
        preprocess each of the data instances separately by iteratively applying the learned sequence of preprocessing operations, wherein the preprocessing is performed in the reinforcement learning environment utilizing a reward-based training operation by one or more artificial neural networks; and
        ouput a detailed method of the performance of the preprocessing with the preprocessed set of data instances.

7. The system of claim 6, wherein the executable instructions, pursuant to automatically learning, further use reinforcement learning to determine the sequence of actions for preprocessing and transforming each of the data instances separately.

8. The system of claim 6, wherein the executable instructions further use the one or more artificial neural networks to serve as value function approximations, action-value function approximations, and policy function approximations for both approximating a corresponding function used in reinforcement learning and for updating one or more policies, wherein the reinforcement learning environment includes an agent having one or more decision components and the one or more artificial neural networks.

9. The system of claim 6, wherein the executable instructions further provide one or more completely transformed and preprocessed data instances through a decision made by utilizing value functions approximated by the one or more artificial neural networks trained during the reward-based training operation.

10. The system of claim 6, wherein the executable instructions further provide one or more partially preprocessed data instances and a corresponding reward indicating a level of preprocessed quality for the one or more partially transformed and preprocessed data instances.

11. A computer program product for automatic data preprocessing for a machine learning operation by a processor, the computer program product comprising a non-transitory computer-readable storage medium having computer-readable program code portions stored therein, the computer-readable program code portions comprising:

an executable portion that receives, from a data source, raw data comprising a set of data instances used as input to one or more machine learning models subsequent to the set of data instances being preprocessed, wherein the set of data instances are received with user specification of information including a defined learning task associated with the set of data instances, a set of actions to perform when preprocessing the set of data instances based on a content of the set of data instances, and a set of constraints indicating which of the set of actions are to be applied to a selected part of a data instance of the set of data instances;

an executable portion that automatically learns in a reinforcement learning environment, for each data instance in the set of data instances, a sequence of preprocessing operations for preprocessing each of the data instances separately;

an executable portion that preprocesses each of the data instances separately by iteratively applying the learned sequence of preprocessing operations, wherein the preprocessing is performed in the reinforcement learning environment utilizing a reward-based training operation by one or more artificial neural networks; and an executable portion that outputs a detailed method of the performance of the preprocessing with the preprocessed set of data instances.

12. The computer program product of claim 11, wherein the executable portion that automatically learns, further uses reinforcement learning to determine the sequence of actions for preprocessing and transforming each of the data instances separately.

13. The computer program product of claim 11, further including an executable portion that uses the one or more artificial neural networks to serve as value function approximations, action-value function approximations, and policy function approximations for both approximating a corresponding function used in reinforcement learning and for updating one or more policies, wherein the reinforcement learning environment includes an agent having one or more decision components and the one or more artificial neural networks.

14. The computer program product of claim 11, further including an executable portion that:

provides one or more completely transformed and preprocessed data instances through a decision made by utilizing value functions approximated by the one or more artificial neural networks trained during the reward-based training operation; or provides one or more partially preprocessed data instances and a corresponding reward indicating a level of preprocessed quality for the one or more partially transformed and preprocessed data instances.

* * * * *